(12) United States Patent
Wilhelm et al.

(10) Patent No.: US 8,925,088 B1
(45) Date of Patent: Dec. 30, 2014

(54) METHOD AND APPARATUS FOR AUTOMATICALLY EXCLUDING FALSE POSITIVES FROM DETECTION AS MALWARE

(75) Inventors: Jeffrey Wilhelm, Manhattan Beach, CA (US); Abubakar Wawda, Torrance, CA (US)

(73) Assignee: Symantec Corporation, Mountain View, CA (US)

( * ) Notice: Subject to any disclaimer, the term of this patent is extended or adjusted under 35 U.S.C. 154(b) by 1188 days.

(21) Appl. No.: 12/534,171

(22) Filed: Aug. 3, 2009

(51) Int. Cl.
G06F 12/14 (2006.01)

(52) U.S. Cl.
USPC .......................................................... 726/24

(58) Field of Classification Search
CPC .............................. G06F 21/56; H04L 63/145
USPC .......................................................... 726/24
See application file for complete search history.

(56) References Cited

U.S. PATENT DOCUMENTS

| 2004/0068663 | A1 | 4/2004 | Sobel | |
| 2007/0180528 | A1* | 8/2007 | Kane | 726/24 |

OTHER PUBLICATIONS

"QLC Folder Exclusion From RealTime AntiVirus Scanning," QuantumLink Communications Pvt Ltd, Mar. 25, 2006. Downloaded from web site http://helpdesk.postmaster.co.in/index.php?_m=knowledgebase&_a=viewarticle&kbarticleid=27 on Oct. 2, 2009.
Staniford, Stuart, "FireEye Malware Intelligence Lab: Do AntiVirus Products Detect Bots?", FireEye blog post, Nov. 20, 2008. Downloaded from web site http://blog.fireeye.com/research/2008/11/does-antivirus-stop-bots.html on Oct. 2, 2009.
Product Description of Thunderbyte Utilities, Copyright Robert M. Slade, 1991, 1992, 1994, 1995. PCTBAV.RVW 950921. Downloaded from web site http://victoria.tc.ca/int-grps/books/techrev/pctbay.rvw on Oct. 2, 2009.
"Trojans—HSC Guides—Ethical Hacker," Feb. 17, 2008. Downloaded from web site http://www.hackerscenter.com/index.php?/HSC-Guides/Ethical-Hacker/Trojans.html on Oct. 2, 2009.
"Virus scanning recommendations for computers that are running Windows Server 2008 R2, Windows Server 2008, Windows Server 2003, Windows 2000, Windows XP, or Windows Vista," Article ID: 822158—Last Review: Sep. 4, 2009—Revision: 11.0, Copyright 2009 Microsoft. Downloaded from web site http://support.microsoft.com/kb/822158 on Oct. 2, 2009.
"Anti-virus Exclusion List," Copyright Aug. 2005 www.BigResource.com. Downloaded from web site http://www.bigresource.com/MS_SQL-Anti-virus-Exclusion-list-bli6kaob.html on Oct. 2, 2009.
"Resetting the Norton AntiVirus Exclusion List to the default setting," Copyright 1995-2009 Symantec Corporation. Downloaded from web site http://service1.symantec.com/SUPPORT/naV.nsf/pfdocs/2004021309574306?Open&docid . . . on Oct. 2, 2009.

* cited by examiner

*Primary Examiner* — Tamara T Kyle
(74) *Attorney, Agent, or Firm* — Wilmer Cutler Pickering Hale and Dorr LLP (57) ABSTRACT

A method and apparatus for automatically excluding false positives from detection as malware is described. In one embodiments, a method for using one or more processors to provide false positive reduction for heuristic-based malware detection of a plurality of files in memory includes accessing global first appearance information associated with a plurality of files, accessing global malware information comprising heuristics and an emergence date associated with each malware group of a plurality of malware groups, comparing the global malware information with the global first appearance information to identify at least one false positive amongst the plurality of files and preventing detection of the at least one false positive as malware.

19 Claims, 5 Drawing Sheets

METHOD AND APPARATUS FOR AUTOMATICALLY EXCLUDING FALSE POSITIVES FROM DETECTION AS MALWARE

BACKGROUND OF THE INVENTION

1. Field of the Invention

Embodiments of the present invention generally relate to a computer system security and, more particularly, to a method and apparatus for automatically excluding false positives from detection as malware by a security module.

2. Description of the Related Art

In a typical computing environment, an organization may employ a number of technologies to process, protect and secure mission critical data. For instance, the organization may employ one or more security systems to detect and/or mitigate threats, such as malware (e.g., worms, viruses and/or the like), intrusions, SPAM and/or the like. Such security systems may include a plurality of client programs and a backend server that deploys various forms of information to the client programs, such as malware definitions, white lists, black lists, heuristics and/or the like.

Each computer of a plurality of computers may configure one or more anti-virus software client programs that utilize heuristics to perform the threat detection. The anti-virus software vendor may employ numerous techniques to create such heuristics, such as machine learning. These heuristics may include code-based invariants and/or activity-based patterns that are associated with malicious software activity. Accordingly, these anti-virus software client programs perform a security scan on a plurality of files to identify and/or mitigate the malicious software activity. Furthermore, the malicious software activity may correspond with a particular malware group.

These heuristics, nonetheless, may determine that a number of files include malicious software code when such files are, in fact, clean and legitimate. Such false positives may delay public deployment of the anti-virus software client programs, definitions and/or heuristics to the plurality of computers. In addition, the detection of any false positives negatively impact user experience. Handling malware detections prevents computer users from performing normal computer tasks. Valuable time and resources are wasted in order to discover that some malware detections are actually false positives.

Therefore, there is a need in the art for a method and apparatus for automatically identifying and preventing one or more false positives from detection as malware.

SUMMARY OF THE INVENTION

Embodiments of the present disclosure generally include a method and apparatus for automatically excluding false positives from detection as malware. In some embodiment, a method for using one or more processors to provide false positive reduction for heuristic-based malware detection of a plurality of files in memory may comprise accessing global first appearance information associated with a plurality of files, accessing global malware information comprising heuristics and an emergence date associated with each malware group of a plurality of malware groups, comparing the global malware information with the global first appearance information to identify at least one false positive amongst the plurality of files, wherein the at least one false positive having a global first appearance date that predates the emergence date associated with the each malware group of the plurality of malware groups and preventing detection of the at least one false positive as malware.

In some embodiments, the at least one false positive may have a local first appearance date that predates the emergence date associated with the each malware group of the plurality of malware groups. In some embodiments, the method may include preventing a security scan of the at least one false positive. In some embodiments, the method may include comparing an emergence date associated with each of the at least one malware group specific heuristic with a global first appearance date corresponding with each file of the plurality of files to identify the at least one false positive. In some embodiments, the method may include applying the heuristics to the plurality of files to identify at least one suspicious file that matches at least one malware group specific heuristic and then, comparing an emergence date associated with each of the at least one matching malware group specific heuristic with a global first appearance date associated with each of the at least one suspicious file.

In some embodiments, the method may include for each suspicious file of at least one suspicious file, comparing an emergence date associated with each matching malware group specific heuristic with a global first appearance date to identify at least one false positive. In some embodiments, the method may include for each file of the plurality of files, comparing at least one of a global first appearance date or a local first appearance date with an emergence date associated with at least one malware group specific heuristic as defined by the global malware information to identify the at least one false positive.

In some embodiments, the method may include generating false positive information, using the at least one false positive, to exclude the at least one false positive from a security scan by a security module. In some embodiments, the method may include transforming the global malware information and the global first appearance information into the false positive information. In some embodiments, the method may include performing a security scan of the plurality of files, except for the at least one false positive, using at least one malware group specific heuristic.

In some embodiments, an apparatus for providing false positive reduction for heuristic-based malware detection is provided. In some embodiments, the apparatus may include means for processing global first appearance information associated with a plurality of files, means for updating global malware information comprising heuristics and an emergence date associated with each malware group of a plurality of malware groups, means for comparing the global malware information with the global first appearance information to identify at least one false positive amongst the plurality of files and means for excluding the at least one false positive from a security scan.

In some embodiments, the apparatus may include means for preventing detection of the at least one false positive as malware by a security module. In some embodiments, the apparatus may include means for applying the heuristics to the plurality of files to identify at least one suspicious file that matches at least one malware group specific heuristic. In some embodiments, the apparatus may include means for comparing an emergence date associated with each matching malware group specific heuristic with a global first appearance date to identify at least one false positive for each suspicious file of the at least one suspicious file. In some embodiments, the apparatus may include means for comparing at least one of a global first appearance date or a local first appearance date with an emergence date associated with at least one malware group specific heuristic as defined by the global malware information to identify the at least one false positive for each file of the plurality of files.

In some embodiments, a computer-readable-storage medium may be provided that comprises one or more processor-executable instructions that, when executed by at least one processor, causes the at least one processor to access global first appearance information associated with a plurality of files, access global malware information comprising heuristics and an emergence date associated with each malware group of a plurality of malware groups, compare the global malware information with the global first appearance information to identify at least one false positive amongst the plurality of files and prevent detection of the at least one false positive as malware.

In some embodiments, the computer-readable-storage medium may further include one or more processor-executable instructions that prevent a security scan of the at least one false positive. In some embodiments, the computer-readable-storage medium may further include one or more processor-executable instructions that apply the heuristics to the plurality of files to identify at least one suspicious file that matches at least one malware group specific heuristic. In some embodiments, the computer-readable-storage medium may further include one or more processor-executable instructions that compare an emergence date associated with each matching malware group specific heuristic with a global first appearance date to identify at least one false positive for each suspicious file of the at least one suspicious file.

In some embodiments, the computer-readable-storage medium may further include one or more processor-executable instructions that compare at least one of a global first appearance date or a local first appearance date with an emergence date associated with at least one malware group specific heuristic as defined by the global malware information to identify the at least one false positive for each file of the plurality of files. In some embodiments, the computer-readable-storage medium may further include one or more processor-executable instructions that perform a security scan of the plurality of files, except for the at least one false positive, using at least one malware group specific heuristic.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Various embodiments of the present disclosure refer to one or more software modules that cooperate to enable false positive reduction for heuristic-based malware detection systems. A plurality of computers within a global network may periodically submit information associated with a plurality of software programs to a server, which records file names, local first appearance dates (e.g., file creation dates) for a plurality of files and software program names. For each file of the plurality of files, the server may also store an earliest creation date as a global first appearance according to some embodiments. The server updates the global first appearance if an earlier creation date is submitted.

The server may also generate and deploy various anti-virus heuristics to the plurality of computers. The server generally monitors malware infections throughout the global network. The server also logs a first known infection date associated with each malicious software program as an emergence date. As explained further below, these anti-virus heuristics may include code-based and/or activity-based definitions (e.g., hash values) for identifying a specific group of malicious software programs (i.e., related and/or similar malicious software code). The server cooperates with an anti-virus agent on a computer to periodically communicate and install these anti-virus heuristics. The anti-virus may subsequently scan computer memory using the anti-virus heurisitics to identify and remove malicious software programs.

In some embodiments, a comparison module (e.g., the comparison module 336 of FIG. 3) retrieves global first appearance dates from the server and identifies one or more potential false positives amongst the plurality of files. In some embodiments, the comparison module may call a security module (e.g., the security module 340) to determine whether a particular file belongs to a certain malware group by applying one or more malware group specific heuristics. If the security module identifies a matching malware group specific heuristic, the comparison module determines whether a global first appearance date associated with the particular file predates an emergence date associated with the matching malware group. The particular file cannot include malicious software code if the matching malware group did not exist when the particular file was first seen in a global computer network. As such, the particular file may be a false positive. In some embodiments, a prevention module (e.g., the prevention module of FIG. 3) instructs the security module to exclude the particular file from malware detection techniques. For example, the security module may perform future a security scan on the plurality of files except for the particular file.

Alternatively, the comparison module may compare a global first appearance data associated with each file of the plurality files with each emergence date associated with the one or more malware group heuristics. If the comparison module identifies a file having a global first appearance date that predates an emergence date associated with the certain malware group, then there is no need to apply a corresponding malware group heuristic. Because the file was first seen in the global network prior to the emergence of the certain malware group, applying the corresponding malware group heuristic may be unnecessary.

Figure 1:
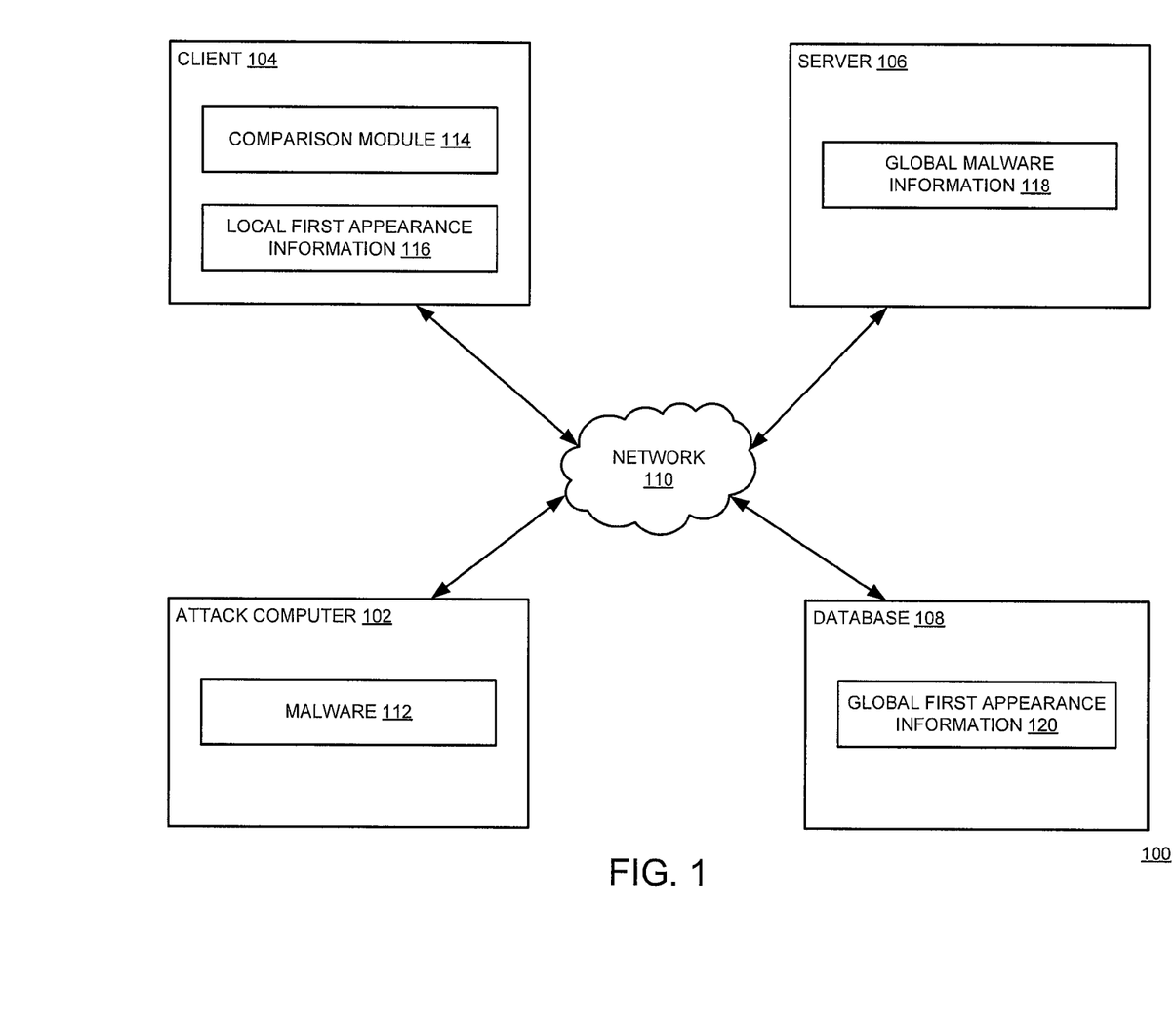
FIG. 1 is a block diagram of a system for automatically excluding false positives from a security scan according to one or more embodiments.

FIG. 1 is a system 100 for automatically excluding false positives from a security scan according to one or more embodiments. In some embodiments, the system 100 includes an attack computer 102, a client 104, a server 106 and/or a database 108 where each component is coupled to each other through a network 110. In some embodiments, malicious software programs may be distributed to the client 104 through the network 110. In another embodiment, the malicious software programs may be distributed without the network 110. For example, the malicious software programs may distributed via infected data on a computer readable medium (e.g., a flash drive, a DVD and/or the like).

Generally, the attack computer 102 and may be a type of computing device (e.g., a laptop, a desktop, a handheld computer, a terminal and/or the like) known to one of ordinary skill in the art having the benefit of this disclosure. The attack computer may be utilized by a hacker to distribute malicious software code, such as malware 112, and disrupt operations at a plurality of computers. In some embodiments, the attack computer 102 attempts to transmit malware 112 to the client 104 in order exert command and control over various components, such as network devices and/or operating systems.

Similarly, the client 104 may be a type of computing device (e.g., a laptop, a desktop and/or the like) known to one of ordinary skill in the art having the benefit of this disclosure. The client 104 includes various data and/or software programs, such as a comparison module 114 and local file appearance information 116 as explained further below.

The server 106 may be a type of computing device (e.g., a laptop, a desktop and/or the like) known to one of ordinary skill in the art having the benefit of this disclosure. The server 106 generally provides various services (e.g., application services, storage services and/or the like) to a plurality of computers throughout the system 100, such as the client 104. The server 106 includes various data and/or software programs, such as global malware information 118.

As explained further below, the global malware information 118 may include heuristics and an emergence date associated with a plurality of malware groups. The heuristics generally indicate patterns or invariants that identify, within a certain file, malicious software code associated with a particular malware group. For example, these patterns may include entry points, various file attributes and/or version information that are similar and/or equivalent amongst one or more members of the particular malware group. For example, the one or more members may be variants (e.g., polymorphic variants) and/or different revisions of each other and/or another member of the particular malware group.

The database 108 includes various hardware and/or software components for maintaining and controlling access to a plurality of records. In some embodiments, the database 108 may be cloud computing resource that is populated with file attributes for the plurality of files that are collected from a plurality of computers over a period of time. The database 108 may include management software for organizing the plurality of records as tables in accordance with a particular model (e.g., relational model, hierarchal model and/or the like). For example, the plurality of records within the database 108 may include global first appearance information 120 as explained further below.

The network 110 comprises a communication system that connects computers by wire, cable, fiber optic, and/or wireless links facilitated by various types of well-known network elements, such as hubs, switches, routers, and the like. The network 110 may employ various well-known protocols to communicate information amongst the network resources. For example, the network 110 may be part of the Internet or intranet using various communications infrastructure such as Ethernet, WiFi, WiMax, General Packet Radio Service (GPRS), and the like. Furthermore, the network 110 may form a portion of a Storage Network Area (SAN) using various communications infrastructure such as Ethernet, Fibre Channel, InfiniBand, Internet Small Computer System Interface (iSCSI) and/or the like.

Figure 2:
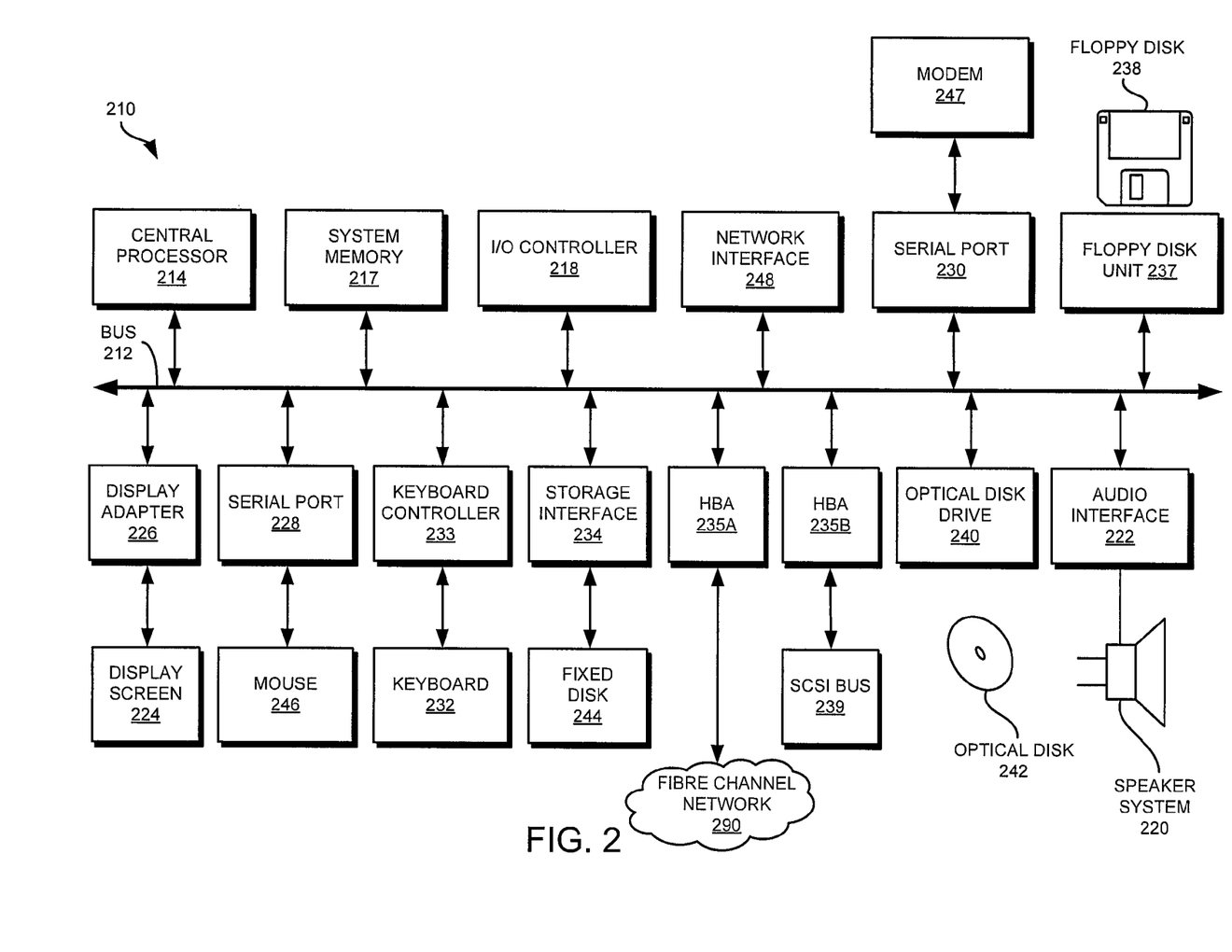
FIG. 2 is a block diagram of a suitable computer for implementing the present disclosure according to one or more embodiments.

FIG. 2 is a block diagram of a computer system 210 suitable for implementing the present disclosure. This system 210 is representative of a computer system that can be used to implement the computer 104 and/or the server 106 of FIG. 1. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral devices. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
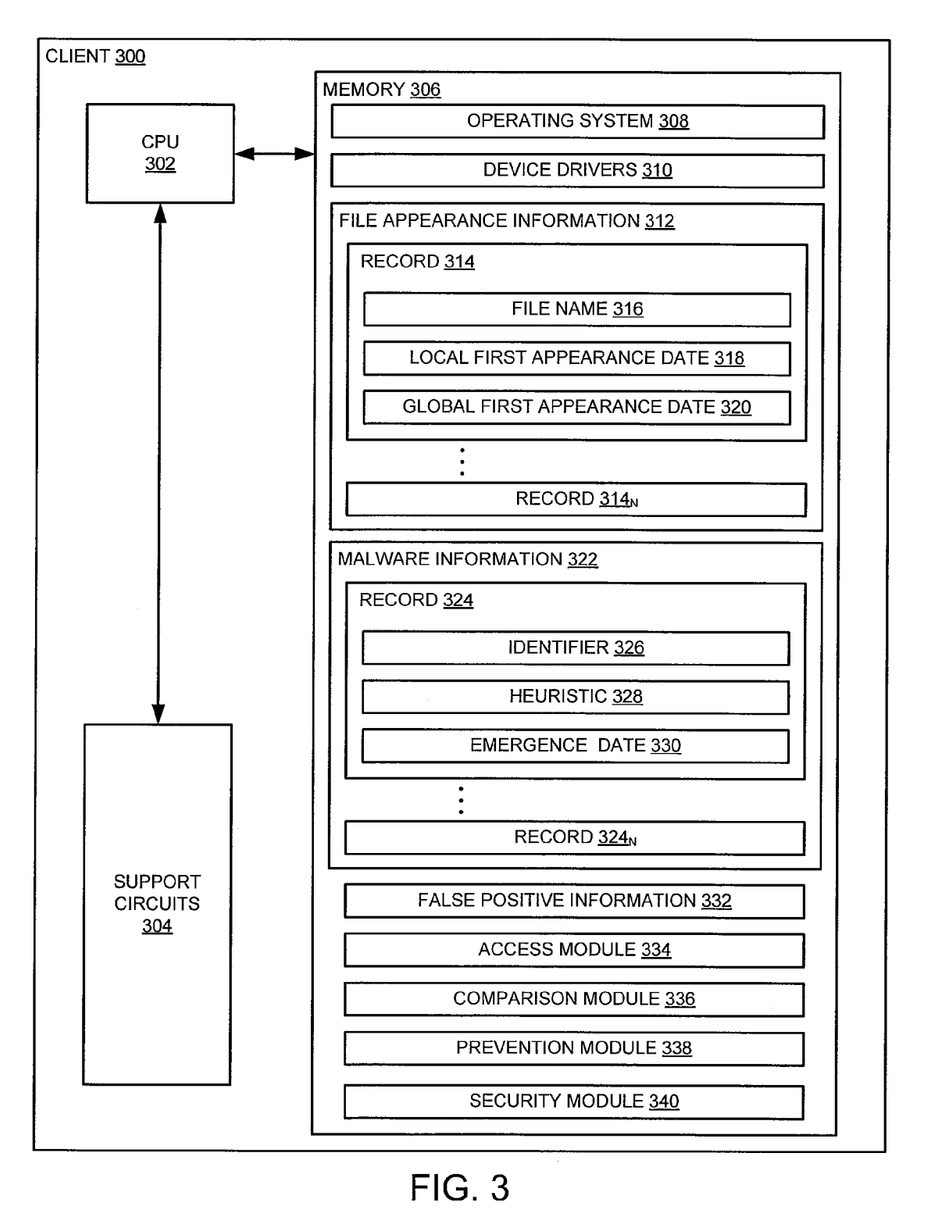
FIG. 3 is a block diagram of a client for automatically excluding false positives from a security scan according to one or more embodiments.

FIG. 3 is a block diagram of a client 300 for automatically identifying and excluding false positives from detection as malware according to one or more embodiments.

The client 300 is a type of computing device (e.g., a laptop, a desktop, a Personal Digital Assistant (PDA), a tablet, a mobile phone and the like) that comprises a central processing unit (CPU) 302, various support circuits 304 and a memory 306. The CPU 302 may comprise one or more commercially available microprocessors or microcontrollers that facilitate data processing and storage. Various support circuits 304 facilitate operation of the CPU 302 and may include clock circuits, buses, power supplies, input/output circuits and/or the like. The memory 306 includes a read only memory, random access memory, disk drive storage, optical storage, removable storage, and the like. The memory 306 includes an operating system 308 and device drivers 310. The memory 306 further includes various data, such as file appearance information 312, malware information 322 and false positive information 332. The memory 306 includes various software packages, such as an update module 334, a comparison module 336, a prevention module 338 and a security module 340.

The operating system 308 generally manages various computer resources (e.g., network resources, data storage resources, file system resources and/or the like). The operating system 308 is configured to execute operations on one or more hardware and/or software components, such as Network Interface Cards (NICs), hard disks, virtualization layers, firewalls and/or the like. For example, the various software packages call commands associated with the operating system 308 (i.e., native operating system commands) to perform various file system and/or storage operations, such as creating files or metadata, writing data to the files, reading data from the files, modifying metadata associated with the files and/or the like. The operating system 308 may call one or more functions associated with the device drivers 310 to execute various file system and/or storage operations. As an example, the operating system 308 may utilize a device driver associated with a NIC card to communicate data to another computer as explained further below.

In some embodiments, the file appearance information 312 may include a plurality of records 314 that form a relational database. Each records of the plurality of records 314 may include a file name 316, a local first appearance date 318 and a global first appearance date 320. The file name 316 may include a string of characters that identify a certain file amongst a plurality of files within a file system. The local first appearance date 318 may refer to a date (e.g., month/day/year and/or time) that the operating system 308 created the certain file. For example, the local first appearance date may be a date at which the client 300 downloaded the certain file from the Internet and stored in the memory 306.

As mentioned in the present disclosure, a plurality of computers, such as the client 300, exchange a plurality of files using various software programs (e.g., email software, instant messaging software, a web browser, a file sharing program and/or the like) through a computer network, such as the Internet. A backend server (e.g., the server 106 of FIG. 1) may maintain a database (e.g., the database 108 of FIG. 1) for storing global first appearance information (e.g., the global first appearance information 120 of FIG. 1) for each file of the plurality of files. The backend server may distribute the global first appearance information to the client 300 on a periodic basis. In some embodiments, the global first appearance information includes a date (e.g., month/day/year and/or time) that the each file of the plurality of files is first seen. For example, the global first appearance information may include a date at which a particular file is uploaded onto an Internet website. This date may be stored as the global first appearance date 320 within a record of the plurality of records associated with the particular file. The local first appearance date 318, in contrast, may be a date at which the particular file is first seen on the client 300.

In some embodiments, the malware information 322 may include a plurality of records 324 arranged in accordance with a relational database model. As explained further below, the malware information 322 may include a local copy of global malware information (e.g., global malware information 118 of FIG. 1). Each of the plurality of records 324 may include an identifier 326, a heuristic 328 and an emergence date 330. The identifier 326 may include a character string that indicates a particular malware group. In some embodiments, the heuristics 328 may include one or more malware group specific heuristics. In some embodiments, the emergence date 330 may include a date (e.g., month/day/year) and/or time at which the particular malware group causes a first infection.

In some embodiments, the access module 334 may include software code (e.g., processor executable instructions) for examining global first appearance information (e.g., the global first appearance information 120 of FIG. 1). The access module 334 may communicate database commands (e.g., queries) to a server (e.g., the server 106 of FIG. 1) and receive one or more records in response. In some embodiments, these records may include one or more heuristics and an emergence date for each malware group. Furthermore, the access module 334 stores these records in the file appearance information 312.

In some embodiments, the comparison module 336 may include software code (e.g., processor executable instructions) for identifying false positives amongst the plurality of files. The comparison module 336 stores information associated with the identified false positives as the false positive information 332. For each file of the plurality of files, the comparison module 336 compares the global first appearance date 320 with the emergence date for the each malware group of a plurality of malware groups according to various embodiments. If the comparison module 336 determines that a certain file is first seen globally before an emergence date of a particular malware group, then there is a strong likelihood that the certain file does not include malicious software code and thus, a potential false positive. If, on the other hand, the comparison module 336 determines that the certain file is first seen globally before the emergence date of the particular malware group, then there is a strong likelihood that the certain file may include the malicious software code. Therefore, the security module 340 may legitimately identify the certain file as malware based on one or more malware group specific heuristics.

In some embodiments, the prevention module 338 may include software code (e.g., processor executable instructions) for excluding the one or more false positives from a security scan by the security module 340. As such, the one or more false positives are prevented from detection as malware. In some embodiments, the prevention module 338 may instruct the security module 340 to pass over one or more false positives during a security scan. In some embodiments, the prevention module 338 communicates the false positive information 332 to the security module 340, which excludes the identified false positives from detection as malware.

In some embodiments, the security module 340 may access global malware information and then, update the malware information 322. In some embodiments, the security module 340 may include software code (e.g., processor executable instructions) for detecting and/or removing malicious software code (e.g., viruses, Trojans, worms and/or the like) from one or more files. In some embodiments, the security module 340 may include various anti-virus software programs, network security programs, online identity theft protection programs and/or the like. The security module 340 may perform a security scan on a plurality of files in order to detect the malicious software code.

Figure 4:
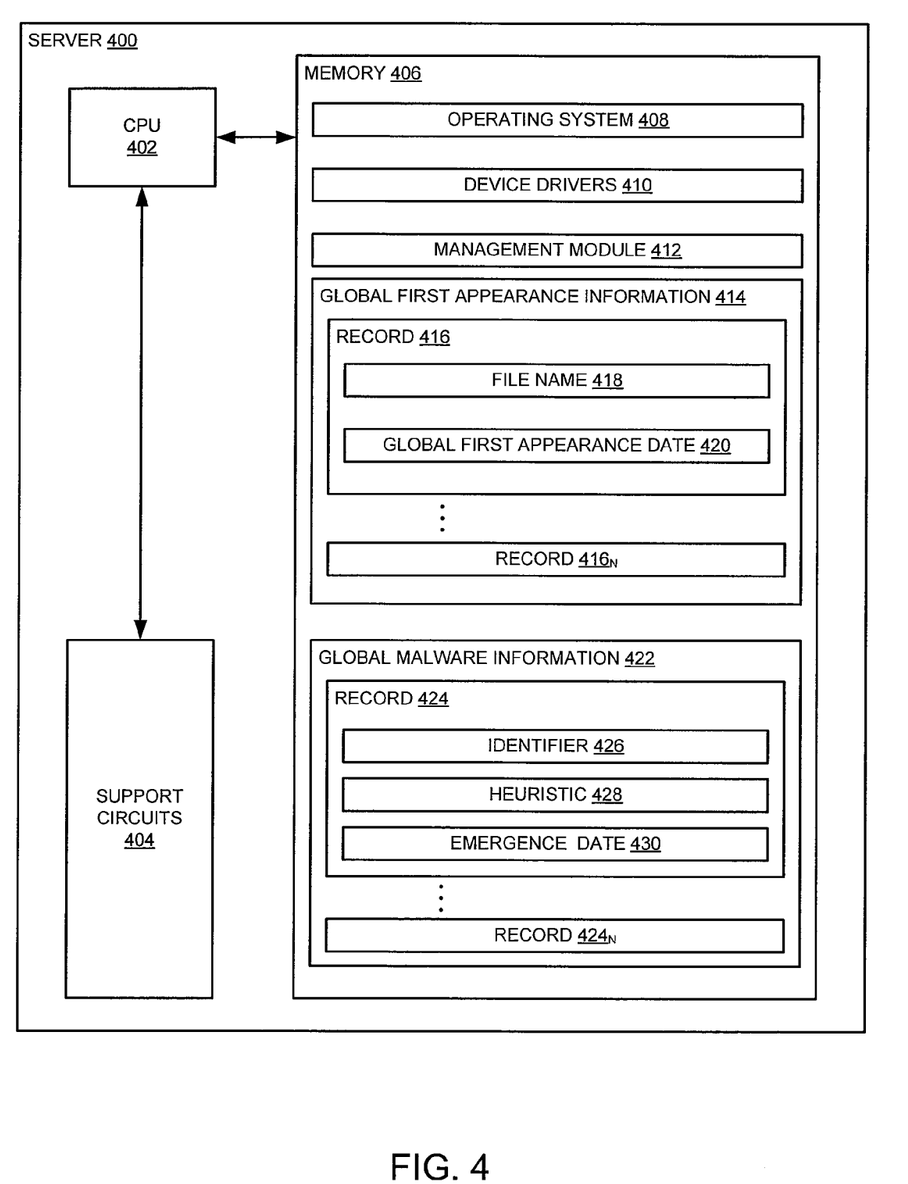
FIG. 4 is a block diagram of a server for automatically excluding false positives from a security scan according to one or more embodiments.

FIG. 4 is a block diagram of a server 400 for automatically identifying and excluding false positives from detection as malware according to one or more embodiments.

The server 400 is a type of computing device (e.g., a laptop, a desktop, a Personal Digital Assistant (PDA), a tablet, a mobile phone and the like) that comprises a central processing unit (CPU) 402, various support circuits 404 and a memory 406. The CPU 402 may comprise one or more commercially available microprocessors or microcontrollers that facilitate data processing and storage. Various support circuits 404 facilitate operation of the CPU 402 and may include clock circuits, buses, power supplies, input/output circuits and/or the like. The memory 406 includes a read only memory, random access memory, disk drive storage, optical storage, removable storage, and the like. The memory 406 includes an operating system 408 and device drivers 410. The memory 406 includes various software packages, such as database management module 412. The memory 406 further includes various data, such as global first appearance information 414 and global malware information 422.

The database management module 412 includes software code (e.g., processor executable instructions) that organizes and facilitates record retrieval from one or more databases (e.g., the database 108 of FIG. 1), such as the global first appearance information 414 and the global malware information 422. The database management module 412 may further include a query controller for accessing one or more records within these databases. Such a query controller includes software code (e.g., processor executable instructions) for performing various database commands (e.g., relational database queries) on the global first appearance information 414 and the global malware information 422.

As mentioned in the present disclosure, a plurality of computers (e.g., the client 300 of FIG. 3) may exchange a plurality of files using various software programs (e.g., email software, instant messaging software, a web browser, a file sharing program and/or the like) through a global computer network, such as the Internet. A backend server (e.g., the server 106 of FIG. 1) may maintain a database (e.g., the database 108 of FIG. 1) for storing the global first appearance information 414 (e.g., the global first appearance information 120 of FIG. 1) for each file of the plurality of files. The backend server may distribute the global first appearance information 414 to the client on a periodic basis.

In some embodiments, the global first appearance information 414 includes a file name 418 that identifies each file of the plurality of files. In some embodiments, the global first appearance information 414 further includes a global first appearance date 420 (e.g., month/day/year and/or time) that the each file of the plurality of files is first seen within the global computer network. For example, the global first appearance information 414 may include a date at which a particular file is uploaded onto an Internet website. As another example, the global first appearance information 414 may include an earliest creation date for the particular file through the global network. This date may be stored as the global first appearance date 420 within a record associated with the particular file of the plurality of records 416.

In some embodiments, the global malware information 422 includes a plurality of records 424. Each of the plurality of records 424 includes an identifier 426, heuristics 428 and an emergence date 430 associated with a particular malware group of a plurality of malware groups. The emergence date 430 may include a date (e.g., month/day/year and/or time) at which the particular malware group was first detected within the global computer network. For example, the emergence date 430 may be a first infection date associated with a certain malicious software program within the particular malware group. In some embodiments, the server 400 may be a backend server that monitors the plurality of malware groups and records each emergence date as the emergence date 430.

Figure 5:
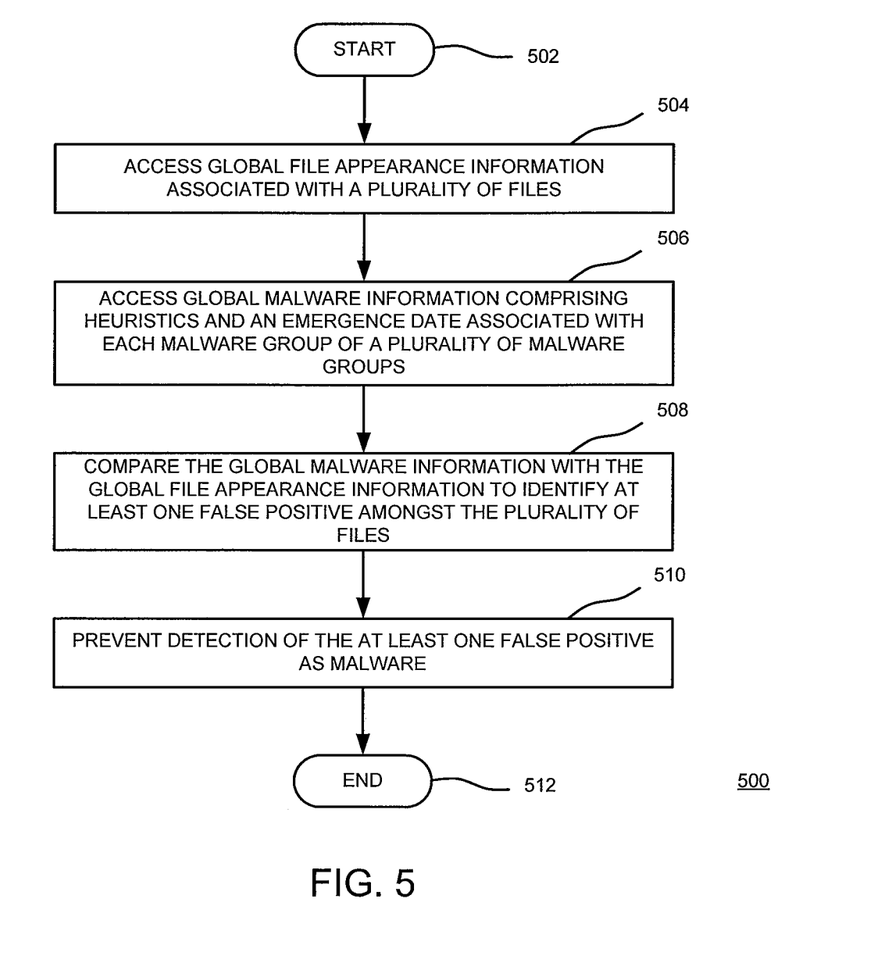
FIG. 5 is flow diagram of method for automatically excluding false positives from a security scan according to one or more embodiments.

FIG. 5 is a flow diagram of a method 500 for automatically excluding false positives from detection as malware according to one or more embodiments. In some embodiments, the method 500 starts at step 502 and proceeds to step 504. At step 504, global first appearance information associated with a plurality of files is accessed. The global first appearance information (e.g., the global first appearance information 120 of FIG. 1 and/or the global first appearance information 422 of FIG. 4) may be stored in a database in memory (e.g., the memory 408 of FIG. 4) to which access is managed by a server (e.g., the server 106 of FIG. 1 and/or the server 400 of FIG. 4) running one or more database management modules. An access module (e.g., the access module 334 of FIG. 3) may communicate commands (e.g., queries) to the server in order to retrieve one or more matching records.

At step 506, global malware information comprising heuristics and an emergence date associated with each malware group of a plurality of malware groups is accessed. In some embodiments, the global malware information may be stored in a database that includes a plurality of records coupled to the server, which manage access to the global malware information in the memory. In some embodiments, a security module (e.g., the access module 340 of FIG. 3) periodically updates local malware information using the global malware information. The security module may communicate one or more database commands to a database management module at the server, which responds with one or more matching records. These matching records may include new malware definitions, malware group specific heuristics and/or the like. Furthermore, these matching records may include emergence dates for recently discovered malware groups.

At step 508, the global malware information is compared with the global first appearance information to identify at least one false positive amongst the plurality of files. In some embodiments, a comparison module (e.g., the comparison module 336 of FIG. 3), using one or more processors, transforms the global malware information and the global first appearance information into false positive information (e.g., the false positive information 332 of FIG. 3). In some embodiments, the comparison module stores the identified false positives in the false positive information in memory (e.g., the memory 308 of FIG. 3) in order to prevent detection as malware as explained further below.

In some embodiments, the comparison module compares an emergence date associated with a particular malware group with a global first appearance date associated with each file of a plurality of files. If the global first appearance date of a certain file exceeds or equals the emergence date associated with the particular malware group, then the certain file may include malicious software code. From example, a member of the particular malware group may have inserted the malicious software code into the certain file. If, however, the global first appearance date of the certain file predates the emergence date associated with the particular malware group, there is a strong likelihood that the certain file does not include the malicious software code. Because the particular malware group did not exist when the certain file was first seen around a global computer network, it is unlikely that a member of the particular malware group inserted the malicious software code.

In some embodiments, the comparison module applies a plurality of malware group specific heuristics to a plurality of files to identify one or more suspicious files. Each of these suspicious files matches a particular malware group specific heuristic. In some embodiments, the comparison module may instruct the security module to perform a security scan of the plurality of files. Accordingly, the security module examines the plurality of files using the plurality of malware group specific heuristics. Based on such an examination, the security module identifies the one or more suspicious files. For each suspicious file of the one or more suspicious files, the comparison module compares a global first appearance date with an emergence date associated with a matching malware group according to one or more embodiments. If the comparison module determines that a global first appearance date predates the emergence date, then there is strong likelihood that a certain suspicious file includes malicious software code.

At step 510, detection of the at least one false positive as malware is prevented. In some embodiments, a prevention module (e.g., the prevention module 338 of FIG. 3) instructs the security module to exclude one or more false positives from a security scan. Accordingly, the one or more false positives are prevented from being detected as malware by the security module. In some embodiments, the prevention module communicates the false positive information to the security module, which performs a security scan on the plurality of files except for the identified false positives. For example, the security module may examine the false positive information before applying one or more heuristics to avoid costly and/or expensive computation. At step 512, the method 500 ends.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A method for using one or more computer processors to provide false positive reduction for heuristic-based malware detection of a plurality of files in a computer readable memory, comprising:
   receiving at least one local first appearance date associated with each file of a plurality of files;
   accessing global first appearance information associated with each of the plurality of files, wherein the global first appearance information comprises a global first appearance date of each file of the plurality of files, and wherein the global first appearance date of each file of the plurality of files is an earliest received local first appearance date associated with each of the plurality of files;
   accessing global malware information comprising heuristics and an emergence date associated with each malware group of a plurality of malware groups;
   comparing, using at least one computer processor, the global malware information with the global first appearance information; and
   identifying at least one false positive amongst the plurality of files, wherein the global first appearance date of the at least one false positive predates the emergence date associated with the each malware group of the plurality of malware groups.

2. The method of claim 1, wherein the at least one false positive having a local first appearance date that predates the emergence date associated with the each malware group of the plurality of malware groups.

3. The method of claim 1 further comprising preventing a security scan of the at least one false positive.

4. The method of claim 1, wherein comparing the global malware information with the global first appearance information further comprises comparing the emergence date associated with the each malware group of the plurality of malware groups with a global first appearance date corresponding with each file of the plurality of files to identify the at least one false positive.

5. The method of claim 1, wherein comparing the global malware information with the global first appearance information further comprising:
   applying the heuristics to the plurality of files to identify at least one suspicious file that matches at least one malware group specific heuristic; and
   comparing an emergence date associated with each of the at least one matching malware group specific heuristic with a global first appearance date associated with each of the at least one suspicious file.

6. The method of claim 5, wherein comparing the global malware information with the global first appearance information further comprises for each suspicious file of at least one suspicious file, comparing an emergence date associated with each matching malware group specific heuristic with a global first appearance date to identify the at least one false positive.

7. The method of claim 1, wherein comparing the global malware information with the global first appearance information further comprises for each file of the plurality of files, comparing at least one of the global first appearance date or a local first appearance date with an emergence date associated with at least one malware group specific heuristic as defined by the global malware information to identify the at least one false positive.

8. The method of claim 1 further comprising generating false positive information, using the at least one false positive, to exclude the at least one false positive from a security scan by a security module.

9. The method of claim 8 further comprising transforming the global malware information and the global first appearance information into the false positive information.

10. The method of claim 1 further comprising performing a security scan of the plurality of files, except for the at least one false positive, using at least one malware group specific heuristic.

11. An apparatus for using one or more processors to provide false positive reduction for heuristic-based malware detection of a plurality of files in memory, comprising:
  means for receiving at least one local first appearance date associated with each file of a plurality of files;
  means for processing global first appearance information associated with each file of the plurality of files, wherein the global first appearance information comprises a global first appearance date of each file of the plurality of files, and wherein the global first appearance date of each file of the plurality of files is an earliest received local first appearance date associated with each of the plurality of files;
  means for updating global malware information comprising heuristics and an emergence date associated with each malware group of a plurality of malware groups;
  means for comparing the global malware information with the global first appearance information to identify at least one false positive amongst the plurality of files, wherein the global first appearance date of at least one false positive predates the emergence date associated with the each malware group of the plurality of malware groups; and
  means for identifying at least one false positive amongst the plurality of files.

12. The apparatus of claim 11 further comprising means for preventing detection of the at least one false positive as malware by a security module.

13. The apparatus of claim 11 further comprising means for comparing at least one of the global first appearance date or a local first appearance date with an emergence date associated with at least one malware group specific heuristic as defined by the global malware information to identify the at least one false positive for each file of the plurality of files.

14. The apparatus of claim 11 further comprising means for transforming the global malware information and the global first appearance information into false positive information false positive information, wherein the false positive information excludes the at least one false positive from the security scan by a security module.

15. A non-transitory computer-readable-storage medium comprising one or more processor-executable instructions that, when executed by at least one processor, causes the at least one processor to:
  receive at least one local first appearance date associated with each file of a plurality of files;
  access global first appearance information associated with a plurality of files, wherein the global first appearance information comprises a global first appearance date of each file of the plurality of files, and wherein the global first appearance date of each file of the plurality of files is an earliest received local first appearance date associated with each of the plurality of files;
  access global malware information comprising heuristics and an emergence date associated with each malware group of a plurality of malware groups;
  compare the global malware information with the global first appearance information to identify at least one false positive amongst the plurality of files, wherein the global first appearance date of at least one false positive predates the emergence date associated with the each malware group of the plurality of malware groups; and
  identify at least one false positive amongst the plurality of files.

16. The non-transitory computer-readable-storage medium of claim 15 further comprising one or more processor-executable instructions that, when executed by the at least one processor, causes the at least one processor to:
  prevent a security scan of the at least one false positive.

17. The non-transitory computer-readable-storage medium of claim 15 further comprising one or more processor-executable instructions that, when executed by the at least one processor, causes the at least one processor to:
  apply the heuristics to the plurality of files to identify at least one suspicious file that matches at least one malware group specific heuristic;
  compare an emergence date associated with each matching malware group specific heuristic with the global first appearance date to identify at least one false positive for each suspicious file of the at least one suspicious file.

18. The non-transitory computer-readable-storage medium of claim 15 further comprising one or more processor-executable instructions that, when executed by the at least one processor, causes the at least one processor to:
  compare at least one of the global first appearance date or a local first appearance date with an emergence date associated with at least one malware group specific heuristic as defined by the global malware information to identify the at least one false positive for each file of the plurality of files.

19. The non-transitory computer-readable-storage medium of claim 15 further comprising one or more processor-executable instructions that, when executed by the at least one processor, causes the at least one processor to:
  perform a security scan of the plurality of files, except for the at least one false positive, using at least one malware group specific heuristic.

* * * * *